United States Patent Office.

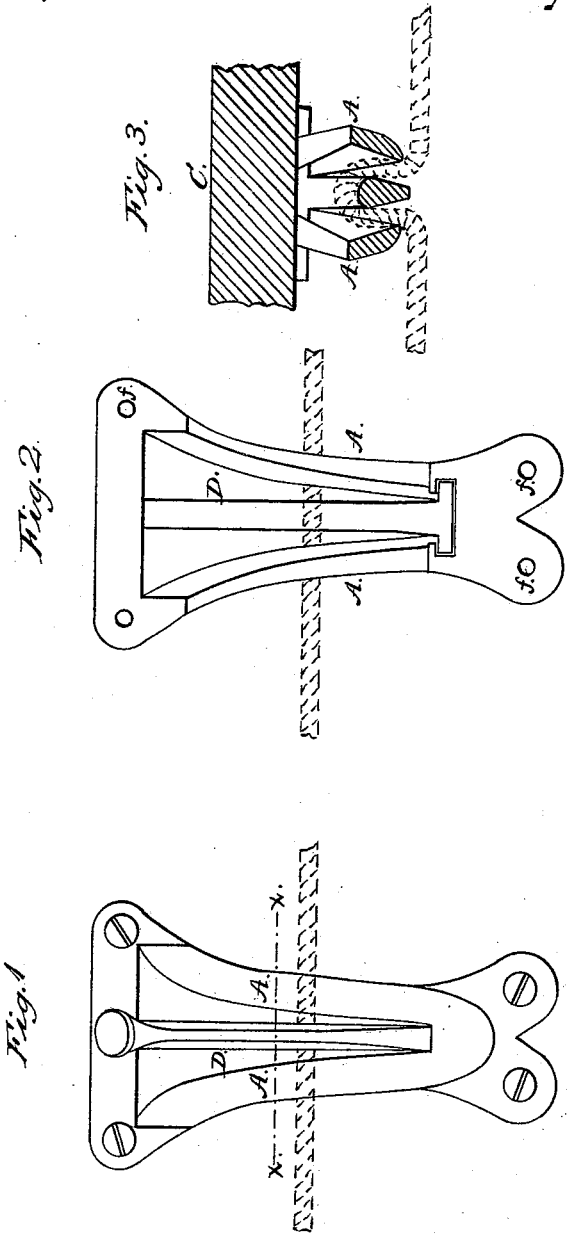

JAMES W. GLADDING, OF NORMAL, ILLINOIS.

Letters Patent No. 77,274, dated April 28, 1868.

IMPROVED CLOTHES-LINE HOLDER.

*The Schedule referred to in these Letters Patent and making part of the same.*

TO ALL WHOM IT MAY CONCERN:

Be it known that I, JAMES W. GLADDING, of Normal, in the county of McLean, and State of Illinois, have invented a new and improved Line-Holder; and I do hereby declare that the following is a full, clear, and exact description thereof, which will enable those skilled in the art to make and use the same, reference being had to the accompanying drawings forming part of this specification.

This invention has for its object to furnish a convenient and secure method for holding clothes-lines in place; and the invention consists in combining and arranging two bevelled jaws with a loose tongue, whereby the line, when passed over or looped on to the tongue, is firmly held and prevented from slipping, as will be hereinafter described.

Figure 1 represents a top view of the holder, showing the line (in red) under the tongue.

Figure 2 is a bottom view of the same.

Figure 3 is a cross-section through the line $x\ x$ of fig. 1.

Similar letters of reference indicate corresponding parts.

A represents the jaws, which are cast or formed together in one piece, and attached to any wooden fixture where it is desired to pass or attach the line. The jaws are bevelled downward and inward from their upper edges, as seen in fig. 3. These jaws bow upward from the block C, to which they are attached, forming an arch or curve.

D is the tongue, which is secured at the base of the jaws by pivots or otherwise, so that it can freely play up and down. This tongue is bevelled, its lower edge being thicker than its upper edge, so that when it is raised, the space between it and the inside of the jaws lessens in width, and consequently presses upon and holds the line the tighter the more it is raised.

The line (when it is fastened by the holder) is passed over the tongue by a loop, as seen in fig. 3. It is pulled well down towards the base of the jaws.

The method of holding the line and of tightening it by the holder will at once be understood from the drawing.

$f$ represents screws and holes to fasten the jaws in any desired position.

I claim as new, and desire to secure by Letters Patent—

The jaws A and the tongue D, constructed, arranged, and operating substantially as shown and described, for the purposes set forth.

JAMES W. GLADDING.

Witnesses:
 EDWIN W. BLISH,
 BRICE SUFFIELD.